Feb. 28, 1961     H. J. WALTER     2,972,927
PRESSURE PLATES FOR FILM PROJECTOR
Filed Jan. 28, 1960

INVENTOR.
HENRY J. WALTER
BY

United States Patent Office 2,972,927
Patented Feb. 28, 1961

2,972,927
PRESSURE PLATES FOR FILM PROJECTOR

Henry J. Walter, Bethpage, N.Y., assignor to Viewlex, Inc., Long Island City, N.Y.

Filed Jan. 28, 1960, Ser. No. 5,220

2 Claims. (Cl. 88—17)

This invention relates to pressure plates and more particularly to such means wherein the tendency of the film to stick to the plates is minimized.

Pressure plates are used to hold the film in a flat plane when in projection position to prevent buckling of the film which causes a loss of focus.

Conventional pressure plates are generally flat glass plates. The film plane temperature is quite high and tends to cause buckling and sticking of the film to the glass. The gelatin surface emulsion of the film absorbs considerable moisture and due to the high temperature in viewing position causes steam which through capillary action creates a suction effect between the film and the smooth glass surfaces of the pressure plates which are mounted on each side of the film thereby causing sticking of the film with resultant inconvenience and possible damage.

The present invention substantially eliminates this defect by providing a roughened surface on the pressure plates so that the smooth suction is broken up. The roughened surface may be provided for instance by etching or other processes providing a roughened surface of relatively fine lines on the plate which are fine enough to minimize light diffusion and minimize abrasion of film in contact therewith. Raised edge strips are mounted on the glass plates to hold the center of the film away from the glass plates.

Accordingly a principal object of the invention is to provide new and improved pressure plate means for film projectors.

Another object of the invention is to provide new and improved non-sticking pressure plate means for projectors.

Another object of the invention is to provide new and improved pressure plates having a roughened surface to minimize the sticking of film thereto.

Another object of the invention is to provide new and improved pressure plate means comprising a pair of glass plates having raised edges in contact with the film, said plates and edges having a roughened surface to minimize sticking of the film to said plates.

These and other objects of the invention will be apparent from the following specification and drawings of which—

Figure 2:
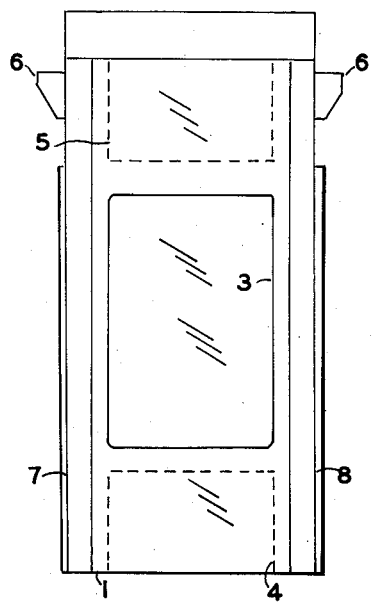
Figure 2 is a front view of a pressure plate embodiment of the invention.

Referring to the figures the pressure plates each comprise a glass plate 1 which is held by a holder 2 having an aperture 3. The holder may be a thin metal plate with side lips which is bonded or cemented to the glass plate 1 by means of adhesive filler strips 4 and 5. The holding plate 2 may have ears 6 or other mechanical connections to hold it in place. On the front or film side of the pressure plate are mounted two strips 7 and 8 which may be of aluminum foil about .005" thick. These strips are commercially available with a heat or pressure sensitive adhesive backing so that they may be bonded onto the glass plates. The purpose of the strips 7 and 8 is to separate the glass surface from the center or viewing area of the film F so that the viewing area will not be scratched for instance by dust rubbing on the glass plate.

Figure 1:
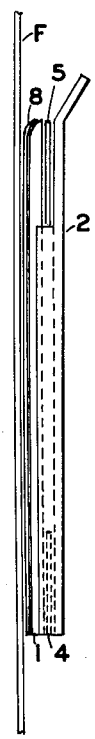
Figure 1 is a side sectional view of an embodiment of the invention.

In use, front and rear pressure plates are mounted together in abutting relation in suitable holders on the projector frame and held together with pressure provided by a light spring with the film between them. In Fig. 1 the film F is shown against one plate, the other plate not being shown.

The pressure plates thus far described are subject to the difficulties mentioned above, namely, the tendency of the film to stick to the plates. Applicant has minimized this sticking by providing the raised edges and treating the areas of the plates and edge strips which face the film so as to provide a roughened surface to break up the suction effect. The texture of the roughened surface is fine enough to minimize light diffusion and abrasion.

It has been found that fine etching, for instance with hydrochloric acid or fluoric acid is suitable, also sand blasting or applying a coat of a transparent or translucent material having the desired roughened texture. The roughening should be uniform to minimize differences in light transmission characteristics.

Various other processes may be used to provide the desired roughened surface, for instance the processes used in metalizing, plasticizing, or the plates themselves could be fabricated originally with a frosted or etched surface.

The etching may be performed with any solvent for the materials comprising the plate and the raised edges. When etching with acid or other solvents one procedure is to brush or apply the acid or solvent on the surface to be etched allowing it to stand for a short time, which is not critical, and then washing off or otherwise removing the acid or solvent. The acid or solvent should be applied uniformly to minimize differences in light transmission characteristics. Also the texture of the etching should be fine to minimize light diffusion.

The same fine texture may be obtained by sand blasting with very fine grains of sand, or equivalent. A coating such as provided by clear varnishes, shellacs or other equivalent paint derivatives may be used provided that the material used does not become sticky at the film plane temperature.

I claim:

1. Pressure plate means for film comprising a pair of glass plates, raised edges on said plates to support said film, said plates having an etched surface to minimize sticking of the film thereto, said etched surface being of sufficiently fine texture to limit abrasion of film and light diffusion to a degree sufficient for practical use of said film for viewing.

2. Pressure plate means for film comprising a pair of glass plates, frame means to mount said plates in abutting relation on either side of a film and anti suction means to minimize the sticking of said film to said plates comprising a fine texture roughened surface on said glass plates on the sides thereof abutting said film, said texture being sufficiently fine to limit abrasion of film and light diffusion to a degree sufficient for practical use of said film for viewing.

References Cited in the file of this patent

UNITED STATES PATENTS

| | | |
|---|---|---|
| 1,154,819 | White | Sept. 28, 1915 |
| 1,957,904 | Ord | May 8, 1934 |
| 2,102,161 | Newman | Dec. 14, 1937 |
| 2,506,765 | Bach | May 9, 1950 |
| 2,534,732 | Perillo | Dec. 19, 1950 |
| 2,889,645 | Thieme | June 9, 1959 |